3,498,977
N-CARBAMYL AND THIOCARBAMYL-4-CAR-
BETHOXY-4-PHENYLPIPERIDINES
Frank H. Clarke, Jr., Armonk, and Fred B. Block, Harts-
dale, N.Y., assignors to Geigy Chemical Corporation,
Ardsley, N.Y., a corporation of New York
No Drawing. Filed Apr. 10, 1967, Ser. No. 629,386
Int. Cl. C07d 29/36, 87/46; A61k 27/00
U.S. Cl. 260—247.2                                  9 Claims

ABSTRACT OF THE DISCLOSURE

N-carbamyl- and N-thiocarbamyl-4-carbethoxy-4-phe-nylpiperidines are neutral analgesics and are obtained from the corresponding N-unsubstituted piperidine through the action of a carbamyl chloride, thiocarbamyl chloride, isocyanate or isothiocyanate.

DETAILED DESCRIPTION

The present invention relates to novel organic compounds and to processes for their preparation. In particular the present invention relates to compounds of the formula:

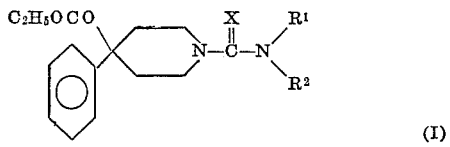

(I)

wherein X is oxygen or sulfur, and each of $R^1$ and $R^2$ taken independently is hydrogen or (lower)alkyl and $R^1$ and $R^2$ taken together with the nitrogen to which they are attached are morpholino, piperidino or pyrrolidino.

The foregoing N-carbamyl- and N-thiocarbamyl-4-carbethoxy-4-phenylpiperidines demonstrate analgesic properties with little or no addiction liability and are thus useful for the treatment of pain such as is encountered in postoperative, postpartum and traumatic conditions, arthritis, cephalalia, bursitis and the like. They may be administered alone, or in combination with other agents such as aspirin, phenacetin, caceine and the like, in suitable pharmaceutical formulations such as tablets, capsules, suspensions, suppositories and the like.

In the context of this specification and the claims, the term "alkyl" and derivations thereof containing the root "alk," such as alkylene, alkanoyl and the like, represent a hydrocarbon chain of up to thirty carbon atoms, or a group containing such a chain. When qualified by the designation "lower" such chains will contain from one to six carbon atoms, inclusively. It is to be understood that when the functional groups of derivations of alkyl implicity require more than one carbon atom, such as the double bond in "alkenyl," there will be at least two carbon atoms present.

The compounds of the present invention are prepared via treatment of a compound of the formula:

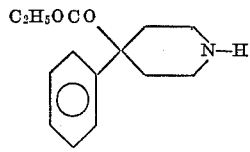

(II)

with a carbamyl chloride or thiocarbamyl chloride in an inert solvent such as benzene or chloroform. The carbamyl chloride or thiocarbamyl chloride may be replaced with an amine, including ammonia, and phosgene or thiophosgene.

Alternatively, the compounds of Formula II are treated with an isocyanate or thioisocyanate, or with a salt thereof, to yield the compounds of Formula I wherein at least one of $R^1$ and $R^2$ is hydrogen.

Those compounds of Formula I wherein X is oxygen may be converted to those wherein X is sulfur via the action of phosphorus pentasulfide. Those compounds of Formula I wherein X is sulfur may be converted to those wherein X is oxygen via the action of mercuric oxide.

The following examples will serve to further typify the nature of the present invention.

Example 1

To a solution of 3.91 mmole of 4-carbethoxy-4-phenylpiperidine in 40 ml. of dimethylformamide and 0.75 g. of sodium bicarbonate under anhydrous conditions is added dropwise a solution of 0.42 g. (3.91 mmole) of dimethylcarbamyl chloride in 20 ml. dimethylformamide. The mixture is refluxed for 16 hours, filtered and concentrated in vacuo. The residue is recrystallized several times from benzene:cyclohexane:ethyl acetate to yield N-dimethylcarbamyl-4-carbethoxy-4-phenylpiperidine.

Example 2

To a solution of 7.16 mmole of 4-carbethoxy-4-phenylpiperidine in 50 ml. chloroform is added 0.76 g. of sodium bicarbonate and 1.28 g. (8.6 mmole) of 4-morpholinocarbonyl chloride. The mixture is refluxed for four hours, filtered and concentrated in vacuo. The residue is recrystallized from benzene:cyclohexane:ethyl acetate to yield N-morpholinocarbonyl-4-carbethoxy-4-phenylpiperidine.

In a simiilar fashion by employing piperidinocarbonyl chloride and pyrrolidinocarbonyl chloride, there are respectively obtained N-piperidinocarbonyl-4-carbethoxy-4-phenylpiperidine and N-pyrrolidinocarbonyl-4-carbethoxy-4-phenylpiperidine.

Example 3

To a solution of 1.54 mmole of 4-carbethoxy-4-phenylpiperidine in 25 ml. glacial acetic acid is added 1.24 g. of potassium isocyanate. The resulting solution is heated 10 minutes on a steam bath, then diluted with 100 ml. of water and rendered basic with 50% sodium hydroxide solution. The mixture is extracted with chloroform and the chloroform phase washed with water and dried. Evaporation of the dried chloroform extracts and trituration with benzene yields N-carbamyl-4-carbethoxy-4-phenylpiperidine.

Example 4

To a mixture of 0.72 mmole of 4-carbethoxy-4-phenylpiperidine, 1.85 g. of sodium bicarbonate and 50 ml. of anhydrous benzene are added 17 ml. of 12.5% phosgene in benzene. After refluxing for 1½ hours the solution is cooled, filtered and concentrated in vacuo. The residue is treated with 8 ml. of 4.3% of alcoholic ammonia solution at 95° C. for 16 hours in a pressure bottle. After evaporation, the resulting residue is taken up in chloroform and washed with water. The dried chloroform solution, upon evaporation yields N-carbamyl-4-carbethoxy-4-phenylpiperidine which is recrystallized from benzene.

Example 5

A solution of 0.38 mmole of 4-carbethoxy-4-phenylpiperidine and 0.3 g. of methyl isothiocyanate in 70 ml. of anhydrous tetrahydrofuran is refluxed for 18 hours under anhydrous conditions. The solution is concentrated and cooled. Recrystallization of the solid from 1:2 ethyl acetate:cyclohexane yields N-methylthio-carbamyl-4-carbethoxy-4-phenylpiperidine which is recrystallized from methanol.

Example 6

A solution of 1.68 mmole of 4-carbethoxy-4-phenylpiperidine, 0.25 g. (2.75 mmole) of ethyl isothiocyanate and 60 ml. of anhydrous tetrahydrofuran is refluxed for 3¼ hours. The solution is concentrated in vacuo and the residue recrystallized from methanol to yield N-ethylthiocarbamyl-4-carbethoxy-4-phenylpiperidine.

Example 7

To a solution of 1.0 g. of N-carbamyl-4-carbethoxy-4-phenylpiperidine in 50 ml. pyridine is added 1.0 g. phosphorus pentasulfide. The solution is refluxed for 3 hours and then concentrated in vacuo. The residue is hydrolyzed in 20 ml. 2 N sodium hydroxide. The solution is then neutralized with dilute hydrochloric acid to yield N-thiocarbamyl-4-carbethoxy-4-phenylpiperidine.

What is claimed is:
1. A compound of the formula:

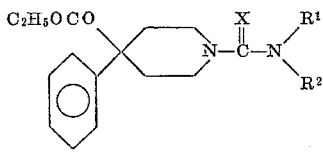

wherein X is oxygen or sulfur
each of $R^1$ and $R^2$ taken independently is hydrogen or (lower)alkyl and $R^1$ and $R^2$ taken together with the nitrogen to which they are attached are morpholino, piperidino or pyrrolidino.

2. The compound according to claim 1 wherein X is oxygen and each of $R^1$ and $R^2$ is hydrogen.
3. The compound according to claim 1 wherein X is oxygen and each of $R^1$ and $R^2$ is methyl.
4. The compound according to claim 1 wherein X is oxygen and $R^1$ and $R^2$ taken together with the nitrogen to which they are attached are morpholino.
5. The compound according to claim 1 wherein X is oxygen and $R^1$ and $R^2$ taken together with the nitrogen to which they are attached are piperidino.
6. The compound according to claim 1 wherein X is oxygen and $R^1$ and $R^2$ taken together with the nitrogen to which they are attached are pyrrolidino.
7. The compound according to claim 1 wherein X is sulfur, $R^1$ is hydrogen and $R^2$ is ethyl.
8. The compound according to claim 1 wherein 5 is sulfur, $R^1$ is hydrogen and $R^2$ is methyl.
9. The compound according to claim 1 wherein X is sulfur and each of $R^1$ and $R^2$ is hydrogen.

References Cited

UNITED STATES PATENTS 3,117,128   1/1964   Mooradian _____ 260—294.3

ALEX MAZEL, Primary Examiner

A. M. T. TIGHE, Assistant Examiner

U.S. Cl. X.R.

260—247.1, 293.4, 294.3; 424—232, 248, 267

PO-1050
(5/69)

UNITED STATES PATENT OFFICE
CERTIFICATE OF CORRECTION

Patent No. 3,498,977  Dated March 3, 1970

Inventor(s) Frank H. Clarke Jr. and Fred B. Block

It is certified that error appears in the above-identified patent and that said Letters Patent are hereby corrected as shown below:

In column 1, line 44, "caceine" should be -- caffeine --

In column 4, line 16, "5" should be -- X --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents